Figure 1:
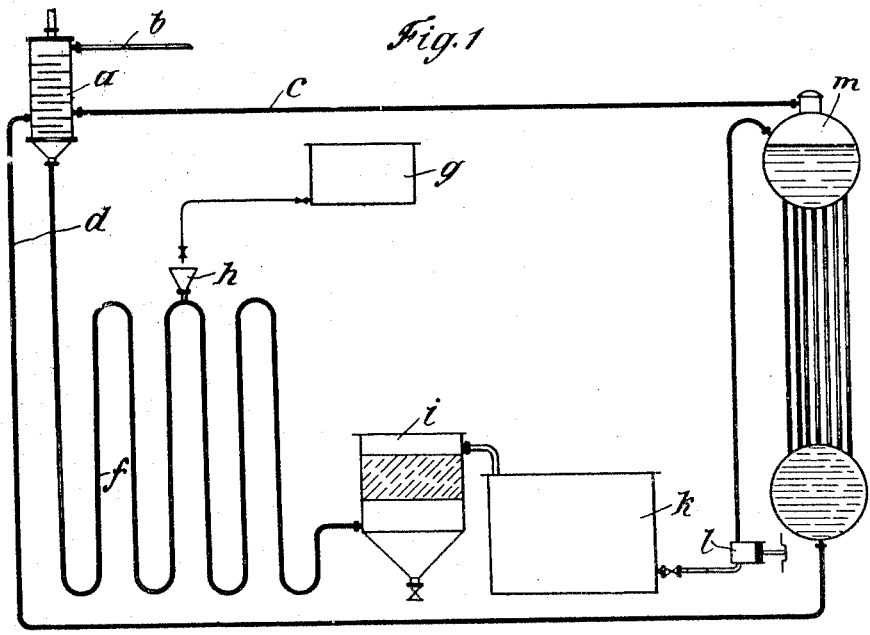

Oct. 30, 1934.  G. HEDRICH  1,978,629

SOFTENING WATER

Filed Aug. 29, 1932

Inventor:
Guido Hedrich
by Marks & Clerk
Attorney

Patented Oct. 30, 1934

1,978,629

UNITED STATES PATENT OFFICE 1,978,629

SOFTENING WATER

Guido Hedrich, Budenheim, Germany, assignor to Chemische Fabrik Budenheim Aktiengesellschaft, Mainz, Germany Application August 29, 1932, Serial No. 630,920
In Germany September 3, 1931

4 Claims. (Cl. 210—16)

This invention relates to a process and apparatus for the softening of water and more particularly concerns a process and apparatus for the softening of boiler-feed water.

The usual apparatus for softening water, particularly boiler-feed water, have the disadvantage that, owing to the slow rate at which the reaction between the hardening constituents of the water and the reagents employed for precipitating the same, proceed to completion, the volume of water under treatment is always a multiple of that which is hourly required for use, for example for feeding steam boilers. As a consequence thereof the dimensions of the softening and purifying apparatus assume extraordinarily large proportions, thus necessitating a correspondingly large covered-in floor space in the boiler house as well as solid foundations and particularly strong construction of the apparatus themselves. It is absolutely impossible to employ apparatus of such large dimensions in all moveable boiler plants, for example in locomotives or ships, because the ballast would be unnecessarily increased thereby. Consequently such moveable boiler plants must either carry a small supply of softened water for a short distance, which in turn necessitates the maintenance of a larger supply of softened water at definite stages, or recourse must be had to water which has not been efficiently softened.

The present invention provides a means for effecting the complete softening of water in the smallest possible space and consists therein that the large reaction containers, usually employed in softening processes involving the use of precipitating agents, are replaced by a system of coils of pipes, in which the interaction between the hardening constituents of the water and the precipitating chemicals, owing to the constant whirling motion of the water not only against the walls of the pipes but also through the curves of the same, proceeds to completion in the shortest imaginable time. The reaction period may be still further very considerably shortened by subjecting the whole system to elevated pressure so that the temperature can be raised above the normal boiling point of the water.

A filter of any desired suitable construction is inserted in the system of reaction pipes before their entry into the steam boiler in order to effect separation of the precipitated hardening constituents.

It is not necessary that the pipes of the softening plant should be bent or curved according to any definite scheme. It is consequently possible to arrange the pipes in the manner best adapted to the space available, for example on locomotives or ships. Thus the requisite pipe lengths may be disposed in the available space entirely or partially in the form of a bundle of pipes or use may be made of floors, walls and covers. The mixing action during the process of softening may be considerably increased by introducing constrictions, which may be capable of regulation, at suitable points in the system.

The invention is not limited to any one definite softening process; it is applicable with the like effect as regards increase of the rate of reaction, to any softening process, in which the hardening constituents of the water are rendered harmless by precipitation with the aid of suitable chemicals. It is, however, applicable with particular advantage to the process of effecting preliminary softening with alkaline residual boiler water and completing the softening with alkali-phosphate.

Figure 2:
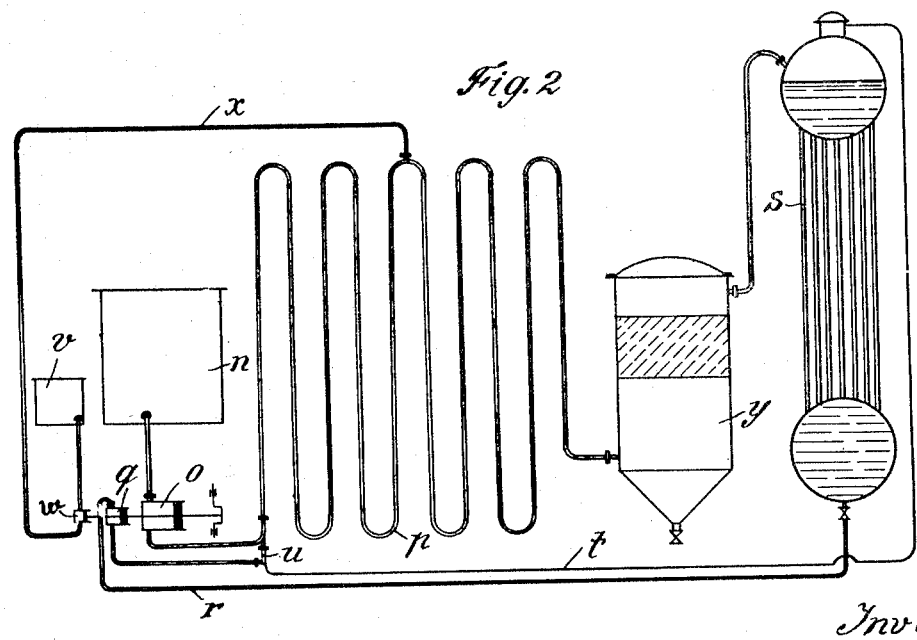

In the accompanying drawing, Figure 1 is a diagrammatic view, in elevation and partly in section, of the preferred embodiment of apparatus for carrying out the method; and Fig. 2 is a similar view, showing a modification of the apparatus illustrated by Fig. 1.

In the modification shown in Fig. 1 the crude water enters the top of the cascade preheater a, through the pipe b and is there preheated by steam entering at c. Residual boiler water is introduced through the pipe d and becomes admixed with the water under treatment. Owing to the suitably selected difference in height between the cascade preheater a and the reaction pipes f the water flows through the pipes f to the filter i. On the way the alkalies present in the residual boiler water react with the crude water and pre-soften the latter. The subsequent softening of the water may, for example, be effected by means of an alkali phosphate solution contained in the storage tank g and introduced through the funnel h, which is disposed at a suitable high position. The complete subsequent softening of the water to 0° hardness takes place in the pipe line between the funnel h and the filter i. After the flocculent precipitate thrown down during the softening process has been separated by the filter i, the water passes into a collecting box k, from which the feed pump l feeds the softened water into the steam boiler m.

In the modification shown in Fig. 2 the whole system stands under an excess pressure corresponding to the pressure in the boiler, thus necessitating the whole plant taking the form of a closed system. The crude water is forced under pressure by means of the feed pump $o$ out of the storage container $n$ into the pipe system $p$. At the same time the pump $q$ conveys residual boiler water from the steam boiler $s$ through the pipe lead $r$, as well as, if required, steam from the dome of the boiler through the pipe lead $t$, by way of the mixing nozzle $u$ into the crude water. In the first half of the passage through the system of reaction pipes pre-softening takes place owing to the interaction of the hardening constituents of the crude water with the alkaline-reacting residual boiler water. The residual hardness is removed, for example by compressing alkali phosphate solution by means of pump $w$ from the storage tank $v$ through the lead $x$ to a suitable point in the pipe system $p$. After the subsequent softening process is completed in the latter half of the passage through the pipe system, the flocculent precipitate is separated from the water in the pressure filter $y$ and the softened water introduced into the steam boiler. In the whole aggregate the pump $o$ replaces the feed pump otherwise usually employed.

The following example serves to illustrate a process for softening water in the plant shown in Fig. 1.

The length of the pipe $f$ from the cascade preheater $a$ up to the point at which the subsequent softening agent is introduced amounts to 15.3 metres and the interior cross section of the same to 21.6 square centimetres. 3050 litres per hour of crude water of 15° British total hardness are introduced through pipe $b$ and 1350 litres per hour of alkaline residual boiler water through pipe $d$ and the mixed waters conveyed onwards through the pipe $f$. When the point $h$ is reached the water is found to have a residual hardness amounting to 1.75° British hardness, which are precipitated with the aid of trisodium phosphate solution introduced from the container $g$. Complete softening to 0° hardness is effected in the line of pipe between $h$ and the filter $i$, having a total length of 10.5 metres, without any detectable excess of precipitating agent being present in the completely softened water. The total pipe line from $a$ to $i$, having a total length of 25.8 metres contains only 55.8 litres but passes hourly 3050+1350=4400 litres of feed water. The rate of flow is accordingly 570 mm. per second. The softening effect, in view of this high rate of flow, is surprising, because even the most recent literature (e. g. Stumper, "Speisewasser- & Speisewasserpflege", Springer, Berlin, 1931) directs that the capacity of the reaction container must amount to at least double the hourly requirement of water and the rate of flow of the water through the purifier, even when softening in the warm, must be less than 1 mm. per second.

I claim

1. A method for softening boiler feed water consisting in adding successively alkaline reacting boiler water and alkali metal phosphate to the water under treatment while flowing rapidly through a closed and unheated pipe system, effecting precipitation of the hardening constituents while the water is flowing through said pipe system, and separating the precipitated hardening constituents from the water.

2. A method for softening boiler feed water consisting in adding successively alkaline reacting boiler water and alkali metal phosphate to the water under treatment while flowing rapidly through a closed and unheated pipe system, effecting precipitation of the hardening constituents while the water is flowing through said pipe system, and separating the precipitated hardening constituents from the water by filtration.

3. A method for treating feed water to soften the same in a boiler system, consisting in mixing the crude water with residual water from the boiler in a preheater into which steam is introduced from the boiler, leading the mixture from the preheater through an elongated reaction coil, introducing a chemical reagent into the reaction coil to commingle with the mixture of crude and residual water to precipitate the hardening constituents contained in the mixture, leading the treated water from the coil through a filter to separate the precipitate from the water, and discharging the filtered water from the filter into the boiler to provide the residual water.

4. A method for treating feed water to soften the same in a boiler system, consisting in passing a mixture of crude water and residual water from the boiler through an elongated reaction coil, introducing a chemical reagent into an intermediate part of the reaction coil to commingle with the mixture of crude and boiler water to precipitate the hardening constituents contained in the mixture, leading the treated water from the coil through a filter to separate the precipitate from the water, and discharging the filtered water from the filter into the boiler to provide the residual water.

GUIDO HEDRICH.